(12) United States Patent
Anthony

(10) Patent No.: US 6,719,316 B1
(45) Date of Patent: Apr. 13, 2004

(54) MOTORCYCLE FOOTREST

(76) Inventor: Michael S. Anthony, 1010 Penn Ave., Ardsley, PA (US) 19038

(*) Notice: Subject to any disclaimer, the term of this patent is extended or adjusted under 35 U.S.C. 154(b) by 0 days.

(21) Appl. No.: 10/375,374

(22) Filed: Mar. 3, 2003

(51) Int. Cl.[7] .............................................. B62J 25/00
(52) U.S. Cl. ........................................ 280/291; 74/564
(58) Field of Search ............................ 280/291, 288.4, 280/163, 164.1; 180/219; 74/564, 560, 562, 562.5, 563; D12/114, 203, 110, 307; D6/501

(56) References Cited

U.S. PATENT DOCUMENTS

| | | | | |
|---|---|---|---|---|
| 1,261,442 A | * | 4/1918 | Rigby | 280/291 |
| 3,960,027 A | | 6/1976 | Magnuson | 74/594.6 |
| 4,174,852 A | * | 11/1979 | Panzica et al. | 280/291 |
| 4,401,315 A | | 8/1983 | Pavincic | 280/259 |
| 4,546,993 A | | 10/1985 | Walker | 280/291 |
| 4,802,684 A | * | 2/1989 | Bennett et al. | 280/291 |
| D388,366 S | * | 12/1997 | Nishino | D12/110 |
| 5,779,254 A | | 7/1998 | James et al. | 280/291 |
| 5,826,900 A | * | 10/1998 | Steele | 280/291 |
| 5,893,424 A | | 4/1999 | Hisada | 180/90.6 |
| 6,142,499 A | * | 11/2000 | Hsieh et al. | 280/291 |
| 6,173,983 B1 | * | 1/2001 | Moore | 280/291 |
| 6,499,378 B1 | * | 12/2002 | Ho | 74/564 |
| 6,578,652 B1 | * | 6/2003 | Kobacker et al. | 180/219 |

OTHER PUBLICATIONS

Daring Kuryakyn Products, "Cruise Arm Mark III", www.kuryakyn.com/products.asp?bn=harley&ci=1167.

\* cited by examiner

Primary Examiner—Lesley D. Morris
Assistant Examiner—Tony Winner
(74) Attorney, Agent, or Firm—Gregory J. Gore

(57) ABSTRACT

A vehicle footrest preferably for a motorcycle provides both an upwardly angled flat surface for comfortably supporting the rider's feet while alternately providing a folding footpeg at approximately the same level as the floorboard. The folding footpeg extends laterally from a concavity along the outside edge of the front of the floorboard. When extended, the footpeg lies approximately in the plane of the floorboard which permits the footpeg to be used as a toerest as well as a full foot support. The combination of structures provides a variety of foot positions while maintaining the feet in safe proximity to the foot controls. The footrest allows the rider to quickly shift the position of his feet from floorboard to footpeg and back again with only a small amount of foot movement.

10 Claims, 4 Drawing Sheets

MOTORCYCLE FOOTREST

FIELD OF THE INVENTION

The present invention relates to footrests for motorcycles or other recreational vehicles. More specifically, it relates to a footrest assembly which provides the combination of footpeg and floorboard footrest structures.

BACKGROUND OF THE INVENTION

Riders of motorcycles and other recreational vehicles typically sit astride the vehicle on a saddle at a comfortable arm's length from a handle bar which provides the means for steering the vehicle. The rider's feet are supported by footrests while in this seated position. There are two types of footrests for vehicles of this kind, footpegs and floorboards. Footpegs are short shafts which project laterally from the vehicle frame. Footpegs are the most commonly used type of footrest because of their simplicity and because, in stirrup fashion, the shaft of the peg can securely engage the heel of the rider's boot. Also, footrests can easily be made to hinge upwardly as a safety feature to prevent the rigid grounding of the vehicle during cornering. For this reason, vehicle regulations require that motorcycle footrests be hinged upwardly.

Floorboards offer a different type of rider foot support in that they provide a flat, upwardly-angled surface facing the rider that supports both the sole and heel portion of the rider's shoe or boot. Floorboards are generally known to provide greater rider comfort because the surface of a floorboard establishes a fixed angle of the rider's ankle. In comparison, a rider's shoe or boot can rotate about a footpeg, therefore holding the foot in a fixed position requires more effort. While floorboards have certain comfort advantages, they do not provide as secure a placement of the rider's foot compared to footpegs since the rider's shoe or boot can slide on the floorboard. Hence, both types of motorcycle footrests have their advantages and disadvantages.

There have been efforts in the art to combine the advantages of both types of footrests by providing motorcycle frames with separately mounted footpegs and floorboards at different locations. The floorboards on motorcycles with these two types of footrests combined are positioned proximate the foot controls so that braking or gear shifting can be quickly and safely accomplished from the foot positioned on the floorboard. The footpegs are mounted at a position above and generally forward of the floorboards to provide leg clearance from the floorboards and foot controls. Footpegs positioned in this manner are generally referred to as "highway pegs" and require a more straight-leg riding position.

However, there are problems with these combined footrest configurations. Since the footpegs require the rider's feet to be positioned more forwardly and in an extended position, they are not in proximity of the foot controls. Also, some riders do not prefer the feet-forward riding position or the greater height of the footpeg from the ground which can make moving the rider's feet between the elevated footpegs and placement on the ground awkward. This movement is often necessary during slow maneuvering of the vehicle. There is therefore a need in the art to provide a footrest system for a motorcycle which provides the benefits of both floorboards and footpegs without the above-described disadvantages.

SUMMARY OF THE INVENTION

In order to overcome the deficiencies in the art of motorcycle footrests, the present footrest device has been devised. It provides both an upwardly angled flat surface of a floorboard for comfortably supporting the rider's feet while also providing a folding footpeg at approximately the same level as the floorboard. In use, the footpeg positively engages the rider's shoe or boot while at the same time maintaining the feet in a relatively close proximity to the foot controls. This structural configuration is achieved by a folding footpeg which extends laterally from a concavity along the outside edge of the front of a the floorboard in its unfolded position. Preferably, the footpeg lies in the plane of the floorboard when the footpeg is extended. This also permits the footpeg to be used as a toe rest if the rider desires to position his feet on the floorboards but angled outwardly. As will be more fully described, not only does the present invention provide the benefits of both floorboards and footpegs, but the present device also allows the rider to quickly shift the position of his feet from floorboard to footpeg and back again with only a small amount of foot movement. The invention therefore provides the two desired features of safety and comfort.

More specifically, the applicant has devised a vehicle footrest comprising a floorboard including means for attachment to a vehicle frame, the floorboard having a substantially planar top surface angled upwardly and further including a concavity at the front along an outside lateral edge thereof. A footpeg extends laterally from the outside edge of the floorboard immediately in front of the concavity. The footpeg is connected to the floorboard by a hinge joint and is movable between folded and laterally-extending unfolded positions. The top surface of the footpeg lies in the plane of the top surface of the floorboard when the footpeg is in its extended position. For safety, the footpeg travels upwardly and rearwardly as it moves from its extended to its folded position. The concavity is dimensioned to receive the heel portion of a vehicle rider's foot when placed on the footpeg. The outside edge of the concavity is preferably arcuate and the footpeg further includes stop means for resisting downward forces when in its extended position. The stop means acts upon a surface within a hinge joint cut-out of the floorboard. The footpegs are preferably located below and in front of each foot control lever which are rotatably mounted to either side of the vehicle frame. Other objects and advantages of the present invention will be readily apparent to those of skill in the art from the following drawings and description of the preferred embodiments.

DESCRIPTION OF THE PREFERRED EMBODIMENT

Figure 1:
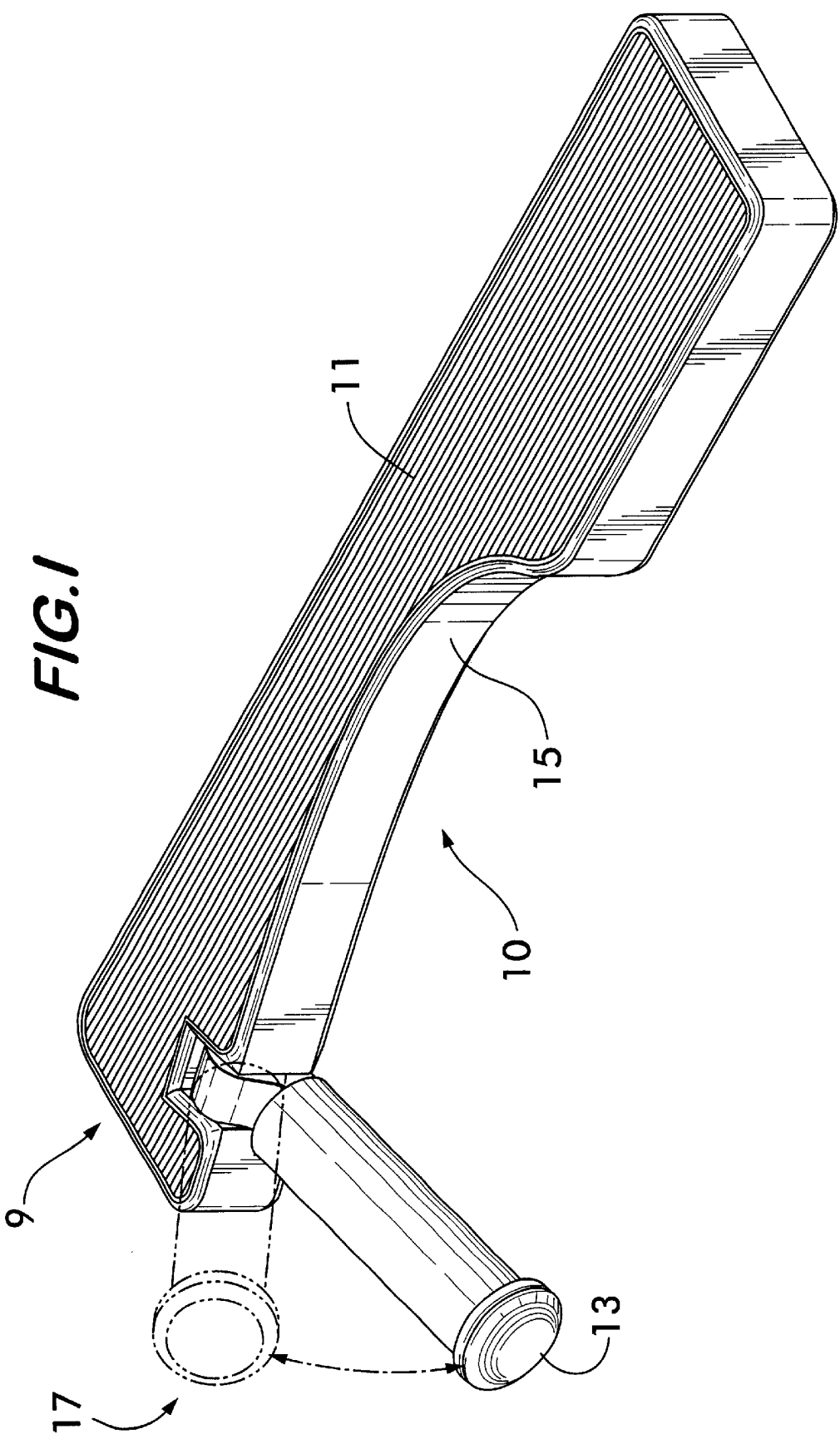
FIG. 1 is a top left rear isometric view of the present invention shown in isolation. The alternate position of the footpeg shown in phantom lines is provided by its folding attachment to the floorboard.

Referring to FIG. 1, the footrest 9 of the present invention is shown in isolation. The footrest has a generally planar top surface 11 which includes a concavity 10 along its outside edge at the front. The outside edge of the concavity 15 is preferably arcuate as shown in this figure. Footpeg 13 is foldable from the laterally-extending operative position shown in this figure to a folded position 17 illustrated with phantom lines.

Figure 2:
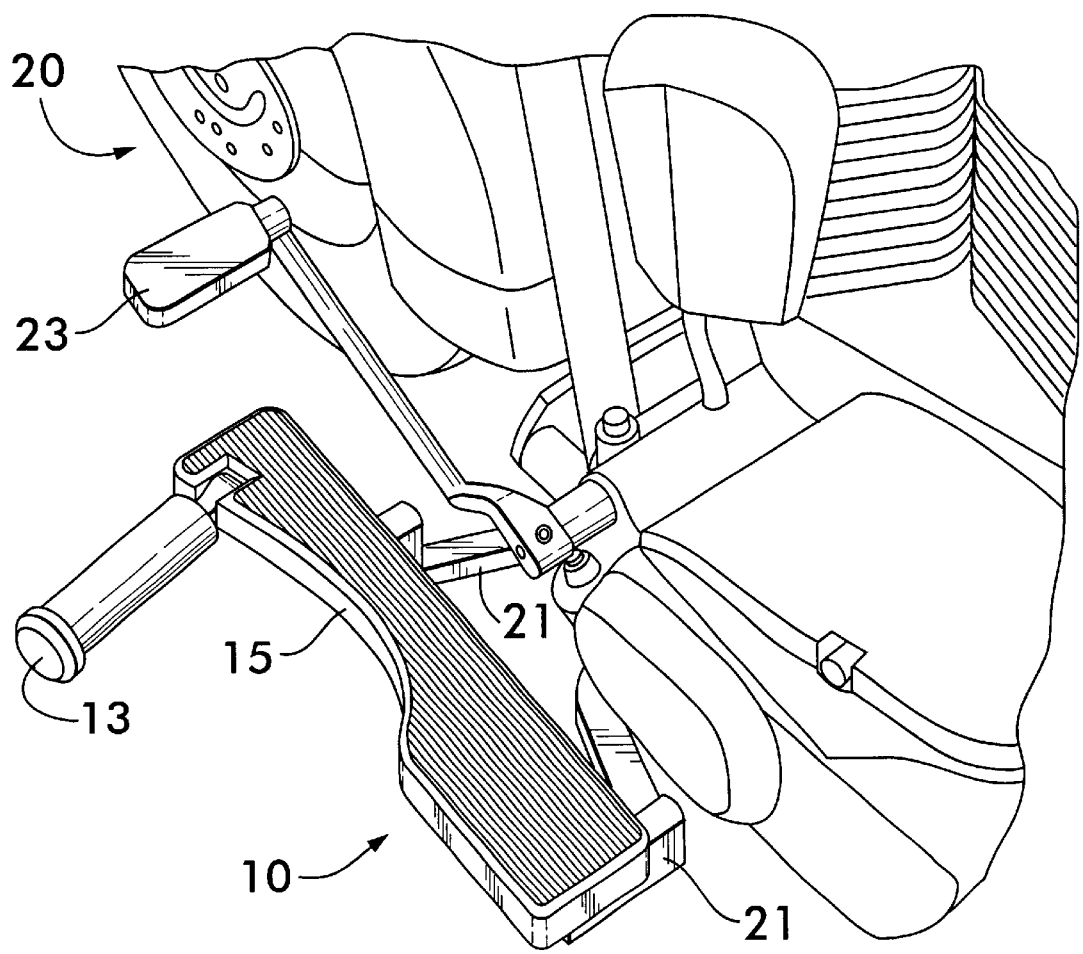
FIG. 2 shows a top left rear isometric view of the present invention affixed to the motorcycle frame.

Referring now to FIG. 2, the footrest of the present invention is shown installed on the vehicle 20 on the left side. The footrest is attached to the vehicle frame by mounting brackets 21 and is positioned directly beneath foot control lever 23 with the footpeg located just in front of the lever. Footpeg 13 extends outward laterally in the unfolded operative position and is affixed adjacent the front of the floorboard along arcuate outside edge 15 that defines a concavity in the footrest immediately to the rear of footpeg 13. The concavity creates a tapered neck region approximately in the middle of the floorboard which includes front and rear portions of greater width.

Figure 3A:
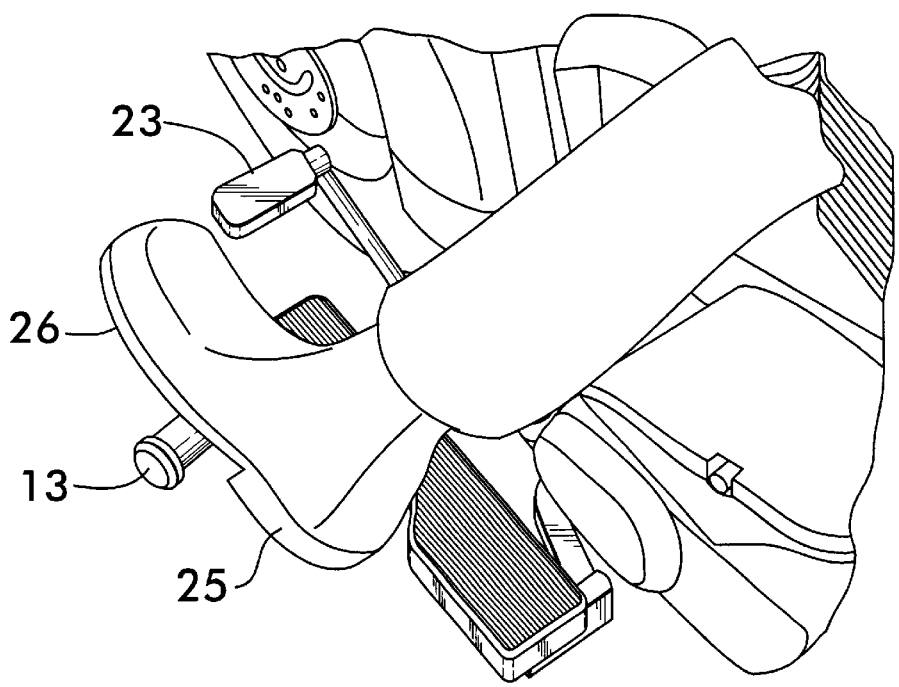
FIG. 3A shows the position of the rider's foot with the rider's boot on the footpeg.
Figure 3B:
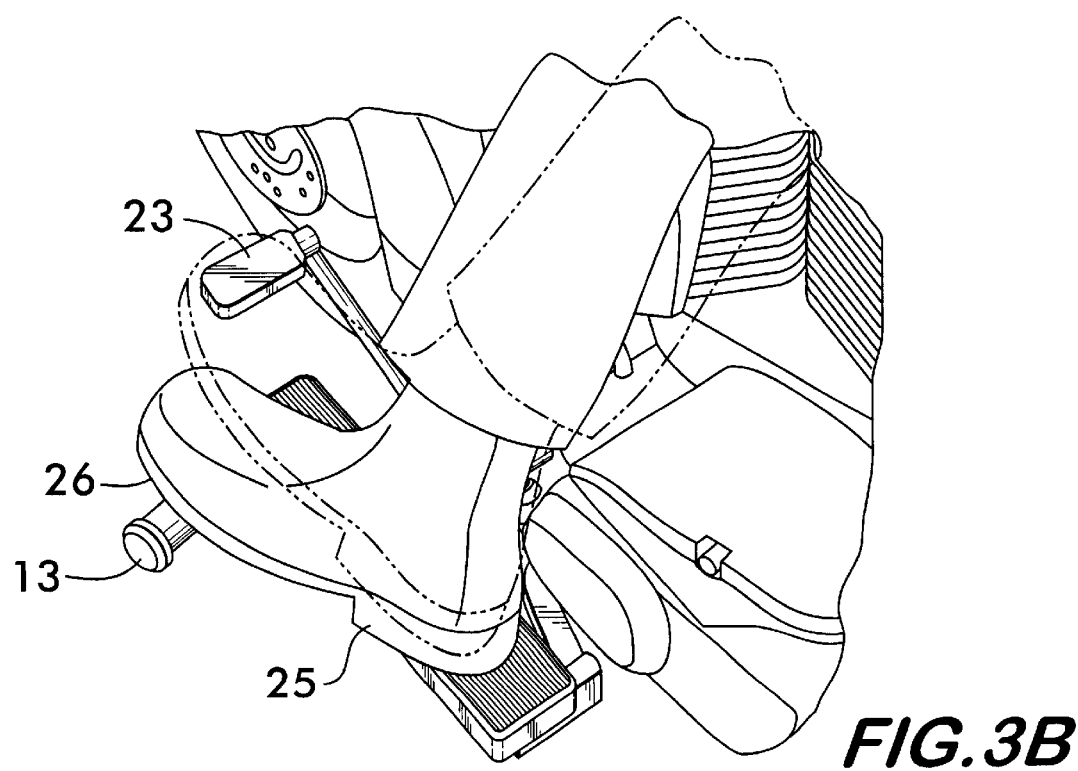
FIG. 3B shows the same structures of FIG. 3A except with the rider's foot placed on the floorboard and footpeg simultaneously. The phantom lines show position of the rider's foot operating the foot controls with the heel portion of the rider's foot remaining on the floorboard.

Referring now to FIGS. 3A and 3B, the footrest of the present invention is shown in alternate modes of use. In FIG. 3A, the rider's foot and boot is shown supported by footpeg 13 with the heel 25 of the rider's boot occupying the space within the floorboard concavity. In this position, the rider's foot is not in a position to directly access control lever 23, however the toe portion 26 of the rider's boot is nonetheless in close proximity to the lever. Referring now to FIG. 3B, the rider's use of the footrest in this figure illustrates use of the floorboard to support the rider's foot. The toe portion 26 of the rider's boot may be placed directly on the front portion of the floorboard or may be angled outwardly slightly so that footpeg 13 provides a toe rest. As shown in this illustration, control lever 23 is immediately accessible by the rider's foot without moving the rider's heel 25 from the floorboard.

By comparing FIGS. 3A and 3B, it will be readily observed that there is minimal foot movement required to transition between floorboard or footpeg foot support. Furthermore, the height of the rider's foot from the ground is approximately equal in both modes of use. Although footpeg 13 is at a higher elevation because it extends from the upwardly-angled front portion of the floorboard, the rider's heel 25 is at approximately the same elevation or lower when on the footpeg since it drops below the surface of the floorboard and occupies the concavity. Hence, the rider's heel 25 shown in FIG. 3A is at approximately the same elevation as it would be when resting on the rearward-most portion of the floorboard as shown in FIG. 3B. Therefore, in either mode of use, the operator's foot remains close to the ground with only a minimal change in the angle of the rider's leg. This provides both comfort and safety.

Figure 4:
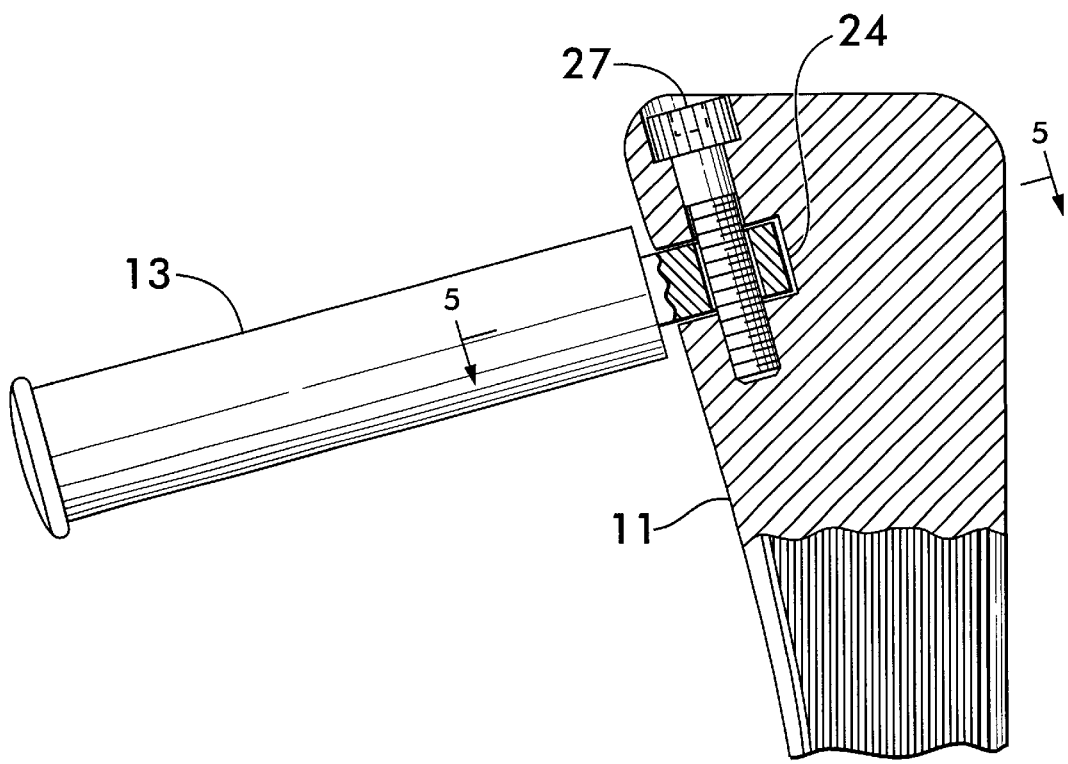
FIG. 4 is a top plan partial cross-section view of the present invention showing the folding joint between the footpeg and the floorboard.
Figure 5:
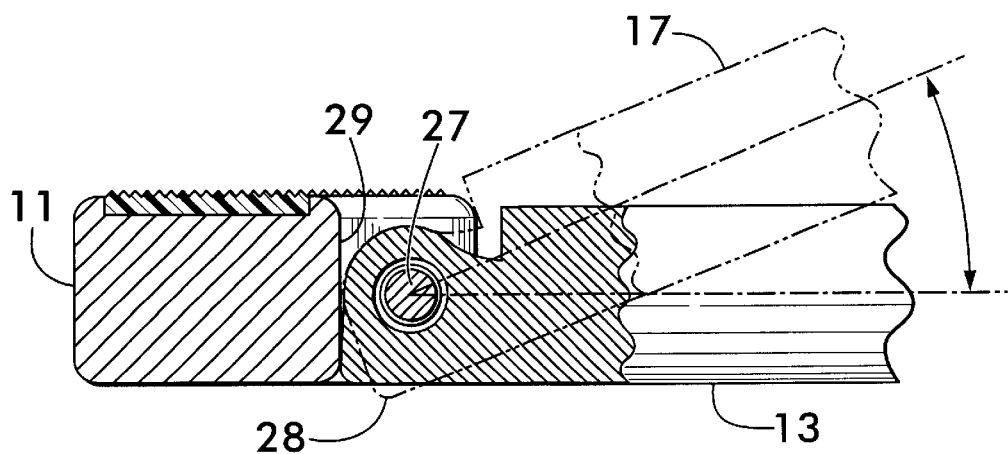
FIG. 5 is a partial cross-sectional front view showing the footpeg joint.

Referring now to FIGS. 4 and 5, details of the hinge joint between the footpeg 13 and the floorboard 11 is shown. As depicted in FIG. 4, screw means 27 establishes a hinge pin within a joint cut-out 24 about which footpeg 13 rotates. As illustrated in FIG. 5, the extended position is secured against further downward movement by stop means 28 which acts against surface 29 of floorboard 11 within the hinge joint cut-out. The top surface of footpeg 13 preferably lies in the plane of the top surface of the floorboard when the footpeg is in its downward-most, laterally extended position. The footpeg 13 is foldable upwardly at least to position 17 shown in phantom.

It should be understood that there may be other modifications and changes to the present invention that will be obvious to those of skill in the art from the foregoing description, however, the present invention should be limited only by the following claims and their legal equivalents.

What is claimed is:

1. A vehicle footrest, comprising:
    a floorboard including means for attachment to a vehicle frame, said floorboard having a substantially planar top surface angled upwardly and further including a concavity at the front along an outside lateral edge thereof; and
    a footpeg extending laterally from the outside edge of said floorboard immediately in front of said concavity.

2. The footrest of claim 1 wherein said footpeg is connected to said floorboard by a hinge joint, said footpeg being movable between folded and unfolded positions.

3. The footrest of claim 2 wherein a top surface of said footpeg lies in the plane of the top surface of said floorboard when said footpeg is in its unfolded position.

4. The footpeg of claim 3 wherein said footpeg travels upwardly and rearwardly as it moves from its unfolded to its folded position.

5. The footrest of claim 4 wherein said concavity is dimensioned to receive a heel portion of a vehicle rider's foot when placed on the footpeg in its unfolded position.

6. The footrest of claim 5 wherein the outside edge of the concavity is arcuate.

7. The footrest of claim 6 further including stop means on said footpeg for resisting downward forces applied to said footpeg when in its unfolded position.

8. The footrest of claim 7 wherein said stop means acts upon a surface of the floorboard within a hinge joint cut-out.

9. The footrest of claim 8 wherein said footpeg is located below and in front of a foot control lever which is rotatably affixed to said vehicle frame.

10. The footrest of claim 1 further including a tapered neck region approximately in the middle of the floorboard which lies between front and rear portions of the floorboard of greater width.

* * * * *